United States Patent
Rollmann et al.

(10) Patent No.: US 8,091,239 B2
(45) Date of Patent: Jan. 10, 2012

(54) METHOD FOR THE PRODUCTION OF A BEARING RING FOR LARGE-SIZE ROLLING BEARINGS

(75) Inventors: Joerg Rollmann, Lippstadt (DE); Wilfried Spintig, Lippstadt (DE); Bernd Stakemeier, Erwitte (DE); Kristian Berggren, Västeras (DE)

(73) Assignees: Rothe Erde GmbH, Dortmund (DE); EFD Induction GmbH, Freiburg (DE)

( * ) Notice: Subject to any disclaimer, the term of this patent is extended or adjusted under 35 U.S.C. 154(b) by 1183 days.

(21) Appl. No.: 11/816,218

(22) PCT Filed: Feb. 11, 2006

(86) PCT No.: PCT/EP2006/001266
§ 371 (c)(1), (2), (4) Date: Aug. 14, 2007

(87) PCT Pub. No.: WO2006/087152
PCT Pub. Date: Aug. 24, 2006

(65) Prior Publication Data
US 2008/0141535 A1 Jun. 19, 2008

(30) Foreign Application Priority Data
Feb. 15, 2005 (DE) .......................... 10 2005 006 701

(51) Int. Cl.
*B21D 53/00* (2006.01)
*B23P 17/00* (2006.01)
*C21D 9/40* (2006.01)

(52) U.S. Cl. ................ 29/898.066; 29/898.13; 148/573; 219/640; 219/642; 384/476

(58) Field of Classification Search ............ 29/898.066, 29/898.13; 219/640, 642; 384/16, 46, 123, 384/476; 148/573
See application file for complete search history.

(56) References Cited

U.S. PATENT DOCUMENTS

| | | | | |
|---|---|---|---|---|
| 3,196,244 A | * | 7/1965 | Wulf | 219/640 |
| 4,673,785 A | * | 6/1987 | Damiani | 219/642 |
| 6,264,768 B1 | * | 7/2001 | Sonti et al. | 148/567 |
| 7,146,735 B2 | * | 12/2006 | Bracht et al. | 29/898.13 |
| 2004/0000053 A1 | * | 1/2004 | Bracht et al. | 29/898.06 |

FOREIGN PATENT DOCUMENTS

| | | |
|---|---|---|
| DE | 10228333 C1 | 9/2003 |
| GB | 735378 | 8/1955 |
| JP | 55008403 | 1/1980 |
| JP | 59118812 | 7/1984 |
| JP | 60116724 | 6/1985 |
| JP | 60116724 A * | 6/1985 |
| JP | 06200326 A * | 7/1994 |

* cited by examiner

*Primary Examiner* — Jermie Cozart
(74) *Attorney, Agent, or Firm* — McGlew and Tuttle, P.C.

(57) ABSTRACT

A method is provided for producing a bearing ring (1) for large-size rolling bearings including at least one track (3) that is provided with a hardened peripheral layer. With the method the peripheral layer that is to be hardened is exposed to the electric field of an inductor in order to be heated and is then quenched. At least two inductors (2) are disposed above a common zone (a) of the annular track (3) that is to be hardened at the beginning of the hardening process. These inductors (2) heat the opposite peripheral layer to a hardening temperature at this location. The inductors (2) are moved in the opposite direction along the annular track in order to heat the adjacent central zones (b). Sprinklers (5) that are directed onto the heated peripheral layers are turned on following a short distance, and the peripheral layers are quenched starting from the center of the zone (a) that was heated at the beginning. The inductors (2) and the sprinklers (5) continue to be moved on the halves of the rings thereof until coinciding again in a zone (c) located opposite the point of departure and once again forming a joint heating zone there. Both inductors (2) are lifted perpendicular to the surface of the track (3) upon reaching the required hardening temperature. The sprinklers (5) are directed onto zone (c).

20 Claims, 4 Drawing Sheets

METHOD FOR THE PRODUCTION OF A BEARING RING FOR LARGE-SIZE ROLLING BEARINGS

CROSS REFERENCE TO RELATED APPLICATIONS

This application is a United States National Phase application of International Application PCT/EP2006/001266 and claims the benefit of priority under 35 U.S.C. §119 of German Patent Application DE 10 2005 006 701.8 filed Feb. 15, 2005, the entire contents of which are incorporated herein by reference.

FIELD OF THE INVENTION

The present invention pertains to a method for producing a bearing ring for large-size rolling bearings comprised of at least one race with a hardened peripheral layer in which the peripheral layer that is to be hardened is exposed to the electric field of an inductor in order to be heated and is then quenched.

BACKGROUND OF THE INVENTION

Large-size rolling bearings in the sense of the present patent application are to be understood as rolling bearings whose bearing rings are bolted through axially introduced passage and/or threaded bores with the connecting structures. Depending on their layout, large-size rolling bearings may be comprised of one or more ball or roller arrays. Appurtenant to each ball or roller array are two races which are finished by metal cutting in two to three bearing rings and subsequently hardened. Such bearing rings can be formed as nose rings, support rings, holder rings, disk-like axial rings, external rings or internal rings, etc.

The races of the bearing rings of large-size rolling bearings are hardened in feed operation with one or two inductors, applying a prior art method. According to this inductive feed hardening method, a so-called inductor, i.e. an induction coil or a pair of induction coils is provided for heating of the race, while for quenching a sprinkler fastened to the inductor and provided for feeding of cooling liquid is arranged above a zone of the race to be hardened which is small in relation to the ring diameter. During hardening, the inductor and the sprinkler once pass over the contour of the race of the entire ring in peripheral direction at a constant feedrate of the ring, so that each segment of the race is continuously heated and quenched.

With this prior art method, a small segment (slip), due to the process applied is incompletely heated. This small segment remains at the end point of hardening. In the area, the race remains softer.

Furthermore, according to the method described in DE 10228333 C1, the races of the bearing rings of large-size rolling bearings can be simultaneously heated with annular inductors by applying a full-surface recirculating heating process, which is also called shot-hardening, and subsequently be hardened by quenching. The benefit of this method lies in avoiding the soft spot described above.

Applying this method involves relatively high costs for the inductors as well as high generator performance rates. With very large rings, a uniform heating is problematic due to temperature-conditioned dilatation.

SUMMARY OF THE INVENTION

It is the object of the present invention to provide a method for producing bearing rings for large-size rolling bearings by which high peripherally constant hardness, i.e. without any slip, can be achieved in the races.

According to the inventive solution, it is provided for that:

a) at the beginning of hardening, at least two inductors are arranged above a joint zone (a) of the annular race to be hardened and heat the peripheral layer juxtaposed there to the hardening temperature;

b) for heating of the subsequent middle zone (b), the inductors can be moved in opposite direction along the annular race;

c) after covering a short distance, sprinklers directed onto the heated peripheral layers are turned-on and these layers are quenched, proceeding from the center of the zone (a) heated at the beginning;

d) the inductors and the sprinklers are continually moved on their ring halves until they coincide again at a zone (c) lying opposite to the point of departure and again form a joint heating zone there;

e) after reaching the required hardening temperature of the zone (c), both inductors are lifted perpendicular from the surface of the race, and f) sprinklers are directed onto the zone (c).

With the inventive method, at least two inductors, preferably two induction coils or two pairs of induction coils, and sprinklers preferably fastened thereto, are arranged above a zone of the race to be hardened which is small in relation to the ring diameter. At the beginning of this method, both inductors are arranged directly side by side and heat the race peripheral layer lying underneath to the hardening temperature (vide Pos.1 in the attached FIGS. 1 and 3). The configuration of a joint heating zone with a constant depth can be achieved by a pendulum-like movement of the inductors or of the ring and by way of an adapted performance control. Subsequently, the two inductors move apart at constant feed in opposite peripheral direction each along the annular peripheral layer of the race to be hardened. Having covered a short distance, the sprinklers which are preferably pivoted to the inductors are turned-on and quench the center of the zone heated at the beginning and divide the zone heated to the hardening temperature into two halves. At a constant feed, each inductor subsequently passes over the race surface of one half of the ring diameter in opposite direction (Pos. II) until both inductors again coincide at a race section lying opposite to the point of departure and form a joint heating zone (Pos. III). As a variant to the method described in FIG. 1, it is possible to provide for a simultaneous pre-warming of the area lying opposite to the point of departure by way of a third inductor (vide FIG. 2). The third inductor is removed as soon as the other two inductors approach each other for hardening this zone and form a joint heating zone analogously to Pos. III of FIG. 1. When both inductors have formed a joint, closed heating zone wherein the race surface temperature ranges at the hardening temperature, both inductors move vertically away from the surface. By swivelling the sprinkler jet into the space between the race surface and the inductors, the joint heating zone is simultaneously quenched.

As a measure designed to assure uniform, even heating of the race in the areas of joint heating zones of both inductors, it is additionally possible to provide grooves or bores, preferably extending radially or axially, at the peripheral rims of the races.

The present invention is further elucidated by way of the figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
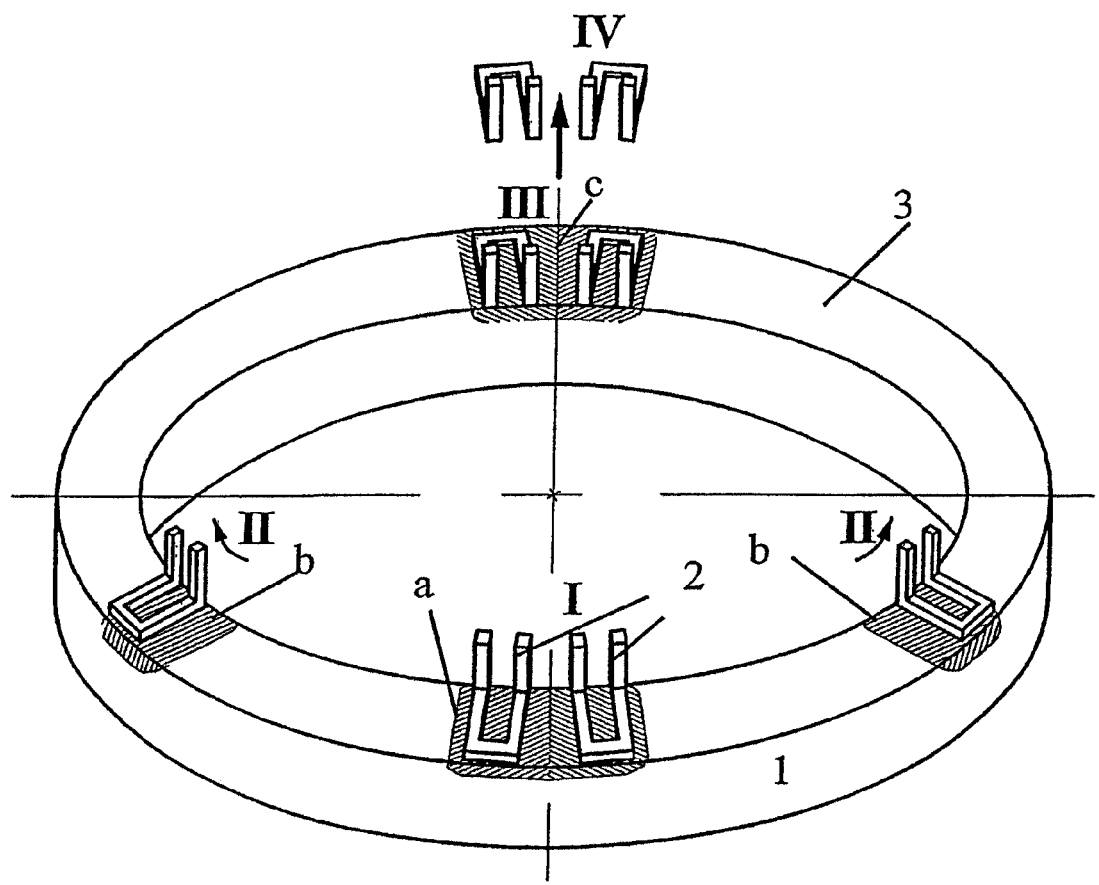
FIG. 1 is a perspective view of a bearing ring with various inductor positions I to IV.

Referring to the drawings in particular, FIG. 1 shows the bearing ring 1 with the axial race 3 to be hardened, and the inductors 2 in various inductor positions I to IV. In position I, at the beginning of heating, zone (a) shown in dashed lines is heated. The two inductors 2 then move along the annular race 3 in the direction of the arrow via the position II with the appurtenant central heating zones (b) into position III with the heating zone (c) there. Upon the end of heating, the inductors 2 are lifted in axial direction from position III into position IV so that the sprinklers pivoted to inductors 2 can also quench the peripheral layer in the area of zone (c).

Figure 3:
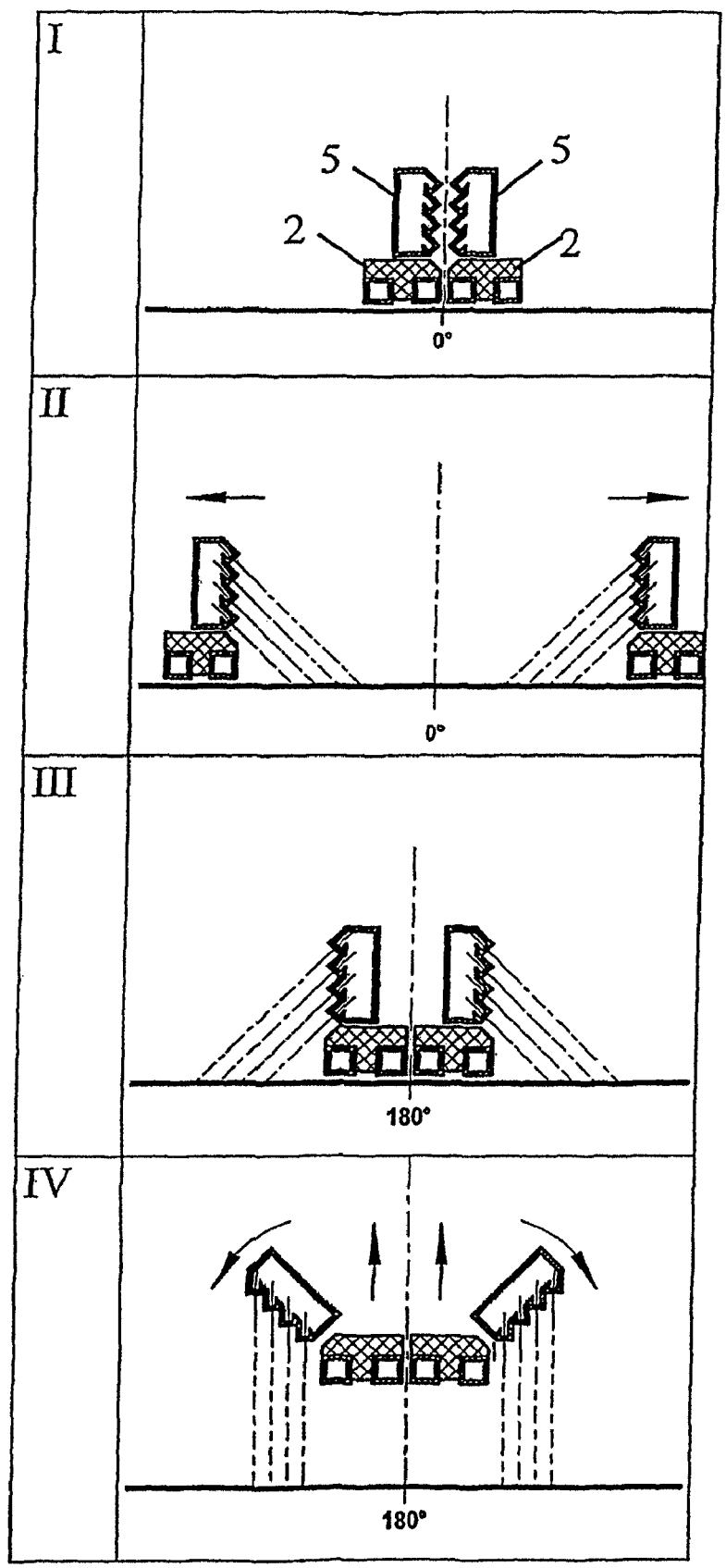
FIG. 3 is a schematic cross section of the inductors 2 and sprinklers 5 in various inductor positions I to N.

Schematically shown in FIG. 3 are the inductors 2 and sprinklers 5 in the four different inductor positions I and IV. In positions I to III, sprinklers 5 are arranged above at the relevant inductors 2. In positions II and III, the sprinkler jets are shown in dashed lines and directed onto the peripheral layer of the race which has just been heated by the aid of inductors 2. In position I, the inductors 2 are still arranged directly side by side and sprinklers 5 have been turned off. In position II, the inductors 2 have moved away a short distance from the 0° line and the sprinkler jets are obliquely directed backwardly on the race. In position III, the inductors 2 have again been united up to the 180° line. By lifting the inductors 2 after position N, the sprinklers pivoted to the inductors are so swivelled that the sprinkler jets are initially directed perpendicular onto the peripheral layer and later-on, if required, even on the surface under inductors 2.

Figure 2:
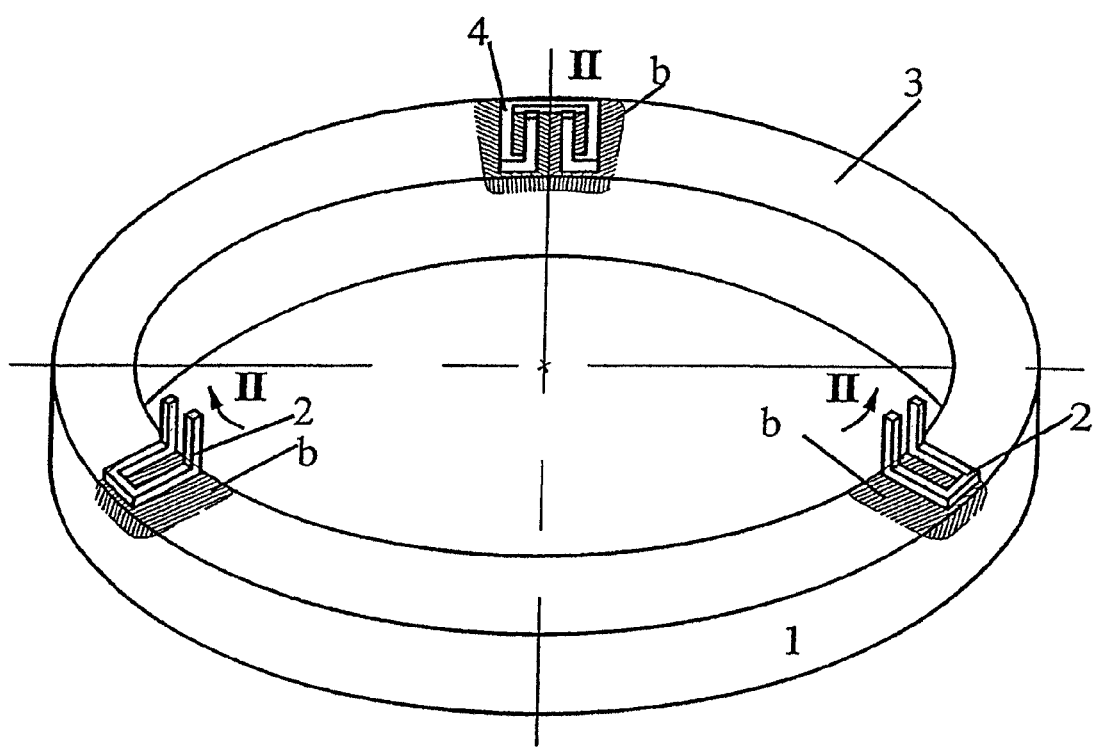
FIG. 2 is a perspective view of a bearing ring with various inductor positions.

Additionally shown in the variant according to FIG. 2 is the inductor 4 for pre-heating which is removed from this area as soon as the other two inductors 2 approach this area.

Figure 4A:
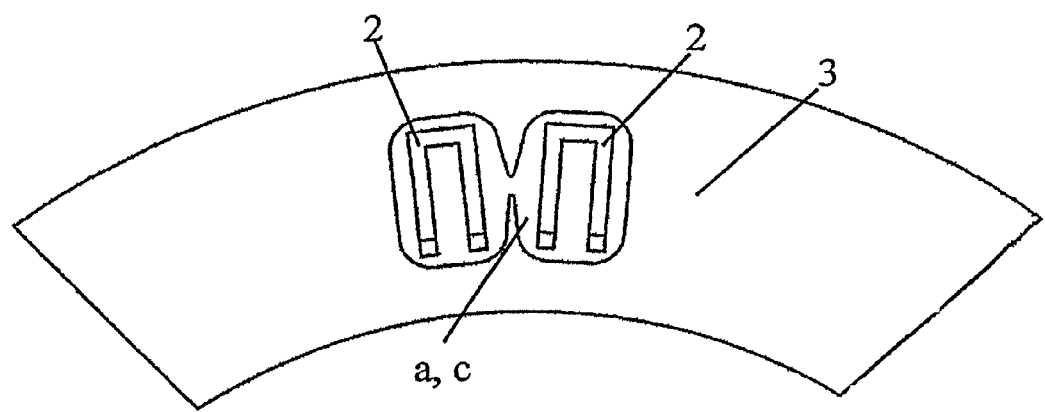
FIG. 4a is a schematic view showing a circular segment of a race with a representation of a joint heating zones a, c.
Figure 4B:
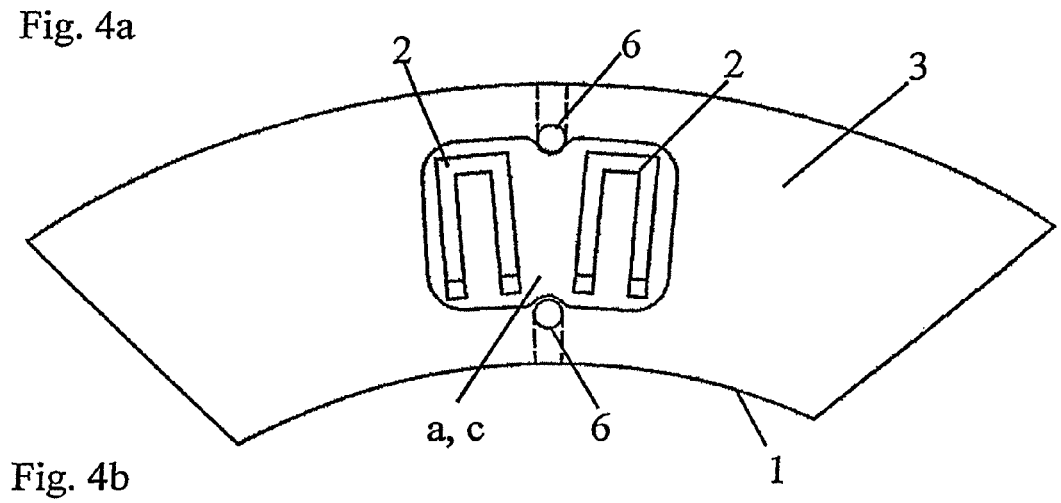
FIG. 4b is a schematic view showing an embodiment of FIG. 4a modified with bores or grooves 6 introduced at the peripheral rims of race 3 and leading to the represented magnified view of the joint heating zones a, c.

In FIG. 4a the circular segment of the race is shown with a representation of joint heating zones a, c. In FIG. 4b an embodiment that is modified versus FIG. 4a is shown with bores or grooves 6 introduced at the peripheral rims of race 3 and leading to the represented magnified view of the joint heating zones a, c. From FIG. 4a and 4b it becomes evident how the joint heating zones (a), (c) are enhanced if appropriate bores or grooves 6 are introduced at the peripheral rims of race 3.

While specific embodiments of the invention have been shown and described in detail to illustrate the application of the principles of the invention, it will be understood that the invention may be embodied otherwise without departing from such principles.

The invention claimed is:

1. A method for producing a bearing ring for large-size rolling bearings comprising at least one race with a hardened peripheral layer, wherein the peripheral layer to be hardened is exposed to the electric field of an inductor in order to be heated and is then quenched, the method comprising the steps of:
    (a) at the beginning of hardening, arranging at least two inductors above a joint zone of a annular race to be hardened and heating the peripheral layer of said annular race at or adjacent to said joint zone to a hardening temperature, said joint zone defining a point of departure of said two inductors;
    (b) for heating of a subsequent central zone, moving the inductors in opposite directions along the annular race, wherein the zone lying opposite to said point of departure is already heated by an additional inductor during heating of the joint zone at the point of departure and/or the subsequent central zone;
    (c) after covering a distance in said step of moving, turning on sprinklers directed onto heated peripheral layers and these layers are quenched, proceeding from the center of the joint zone heated at the beginning of hardening;
    (d) moving the inductors and sprinklers continually on their ring halves until the inductors and sprinklers coincide again at a zone lying opposite to the point of departure and again form a joint heating zone there;
    (e) after reaching the required hardening temperature of the zone lying opposite to the point of departure, lifting both inductors from the surface of the race; and
    (f) directing the sprinklers onto the zone lying opposite to the point of departure.

2. A method as defined in claim 1, wherein axial and/or radial races of a bearing ring are hardened consecutively or simultaneously.

3. A method as defined in claim 1, wherein the sprinklers are moved independently of the inductors along the race to be hardened.

4. A method as defined in claim 1, wherein sprinkler jets are also directed onto the race surface beneath the inductors.

5. A method as defined in claim 1, wherein the inductors and/or sprinklers are moved like a pendulum when moving along the race to be hardened.

6. A method as defined in claim 1, wherein at the beginning step (a) and/or at the end step (c), radially or axially extending bores or grooves are introduced at peripheral rims of the race into the joint heating zones.

7. A method in accordance with claim 1, wherein said sprinklers are pivotably mounted such that said sprinklers pivot in a direction of said zone lying opposite to the point of departure as said inductors are lifted.

8. A method for producing a bearing ring having an annular race, the method comprising the steps of:
    providing a first side inductor and a second side inductor, each inductor for generating an electric field for heating;
    providing a first side sprinkler and a second side sprinkler for quenching;
    arranging the first side inductor and the second side inductor at a joint zone of the annular race to be hardened and heating a peripheral layer of said annular race at the joint zone, with the first side inductor and the second side inductor, to a hardening temperature;
    moving the first side inductor along a first side of the annular race and moving the second side inductor along a second side of the annular race, such that the first side inductor and the second side inductor move in opposite directions along the annular race for heating of a subsequent central zone along the first side of the annular race and a central zone along the second side of the annular race;

turning on sprinklers directed onto heated peripheral layers to quench these layers, proceeding from the center of the joint zone;

moving the inductors and the sprinklers until the inductors and the sprinklers coincide at a second joint zone lying opposite to the joint zone;

providing an additional inductor and heating said second joint zone during the heating of at least one of the joint zone and the central zone;

moving said additional inductor prior to said first and second inductors and said sprinklers coinciding at said second joint zone;

after reaching the required hardening temperature of the second joint zone, lifting both the first side inductor and the second side inductor from the surface of the race; and directing the sprinklers onto the second joint zone.

9. A method as defined in claim 8, wherein axial and/or radial races of a bearing ring are hardened consecutively or simultaneously.

10. A method as defined in claim 8, wherein the sprinklers are moved independently of the inductors.

11. A method as defined in claim 8, wherein sprinkler jets are also directed onto the race surface beneath the inductors.

12. A method as defined in claim 8, wherein the inductors and/or sprinklers are moved pendulously when moving along the race to be hardened.

13. A method as defined in claim 8, wherein radially or axially extending bores or grooves are introduced at peripheral rims of the race into the joint heating zones.

14. A method in accordance with claim 8, wherein said first side sprinkler is pivotably mounted to said first side inductor, said second side sprinkler being pivotably mounted to said second side inductor, said first side sprinkler and said second side sprinkler pivoting in a direction of said second joint zone as said first side inductor and said second side inductor are lifted.

15. A method for producing a bearing ring, the method comprising the steps of:

providing an annular race comprising a first joint zone and a second joint zone, said first joint zone being arranged opposite said second joint zone;

providing a first side inductor and a second side inductor;

providing a third inductor;

providing a first side sprinkler and a second side sprinkler;

arranging said first side inductor and said second side inductor at said first joint zone of said annular race and heating said annular race at or adjacent to said first joint zone to a hardening temperature with the first side inductor and the second side inductor;

moving said first side inductor along a first side of the annular race in a first circumferential direction of said annular race from said first joint zone to said second joint zone such that at least a central zone portion of said first side of said annular race is heated via said first side inductor;

moving said second side inductor along a second side of the annular race in a second circumferential direction of said annular race from said first joint zone to said second joint zone such that at least a central zone portion of said second side of said annular race is heated via said second side inductor, said first circumferential direction being opposite said second circumferential direction;

heating said second joint zone with said third inductor during heating of at least one of said joint zone, said central zone portion of said first side of said annular race and said central zone portion of said second side of said annular race;

quenching said joint zone with said first side sprinkler and said second side sprinkler;

quenching at least said central zone portion of said first side of said annular race with said first side sprinkler;

quenching at least said central zone portion of said second side of said annular race with said second side sprinkler;

moving said first side inductor, said second side inductor, said first side sprinkler and said second side sprinkler until said first side inductor, said second side inductor, said first side sprinkler and said second side sprinkler coincide at said second joint zone;

moving said third inductor prior to said first side inductor, said second side inductor, said first side sprinkler and said second side sprinkler coinciding at said second joint zone;

lifting said first side inductor and said second side inductor relative to a surface of said race after reaching said hardening temperature of said second joint zone; and directing said first side sprinkler and said second side sprinkler onto said second joint zone.

16. A method in accordance with claim 15, wherein axial and/or radial races of a bearing ring are hardened consecutively or simultaneously.

17. A method in accordance with 15, wherein said first side sprinkler and said second side sprinkler are moved independently of said first side inductor and said second side inductor.

18. A method in accordance with claim 15, wherein sprinkler jets are directed onto a surface of said annular race beneath said first side inductor and said second side inductor.

19. A method in accordance with claim 15, wherein one or more of said first side inductor, said second side inductor, said first side sprinkler and said second side sprinkler are moved pendulously when moving along the race to be hardened.

20. A method in accordance with claim 15, wherein radially or axially extending bores or grooves are introduced at the peripheral rims of the annular race into the joint heating zones.

* * * * *